UNITED STATES PATENT OFFICE.

RUDOLF MAAG, OF SINDLINGEN, NEAR HÖCHST-ON-THE-MAIN, GERMANY, ASSIGNOR TO FARBWERKE VORM. MEISTER LUCIUS & BRÜNING, OF HÖCHST-ON-THE-MAIN, GERMANY, A CORPORATION OF GERMANY.

VAT DYESTUFF AND PROCESS OF MAKING SAME.

1,025,147.  Specification of Letters Patent.  Patented May 7, 1912.

No Drawing.  Application filed May 26, 1911. Serial No. 629,630.

*To all whom it may concern:*

Be it known that I, RUDOLF MAAG, Ph. D., chemist, a citizen of the Republic of Switzerland, residing at Sindlingen, near Höchst-on-the-Main, Germany, have invented certain new and useful Improvements in new Vat Dyestuffs and Processes of Making Same, of which the following is a specification.

I have found that benzoquinone-dianilids, which contain halogen both in the benzoquinone-nucleus and in the anilido groups in "para" position to the nitrogen, are valuable yellow vat dyestuffs. These new vat dyestuffs can be obtained by treating halogen derivatives of the benzoquinone, containing more than one halogen atom with anilins substituted in para position by halogen. They are yellowish-brown to brownish-red powders which are insoluble in alcohol, ether and benzene and soluble in hot glacial acetic acid and nitrobenzene with a brownish-red color; when dissolved in concentrated sulfuric acid they give a violet coloration, and when treated with alkaline hydrosulfite they give light-yellowish solutions, from which the dyestuff can be regenerated by passing air into it. The new dyestuffs dye wool fast yellow tints.

In preparing the new dyestuffs, I can, for instance, proceed as follows: 12.7 parts by weight of para-chloranilin are dissolved in 200 parts of alcohol and there are added 17.7 parts of 2.6-dichlorobenzoquinone and the mass boiled until there is no further separation of the dyestuff. The latter is then filtered off and washed with hot alcohol. It forms a yellowish-brown, crystalline powder, chlorobenzoquinone-para-para-dichlorodianalid,

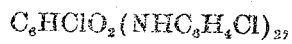

which is insoluble in alcohol, ether and benzene, soluble in hot glacial acetic acid and in nitrobenzene with a reddish-brown color and in concentrated sulfuric acid with a violet color. When gently heated with alkaline hydrosulfite, it yields a light-yellowish vat which dyes wool faint yellow tints, which, by subsequent oxidation in the air, become deep-yellow tints of great fastness.

When working with 2.6-dichlorobenzoquinone, there is formed, besides the dyestuff "chlorobenzoquinonedianilid," the 2.6-dichlorohydroquinol, the structural formula of the 2.6-dichlorobenzoquinone dichloroanilid probably being as follows:

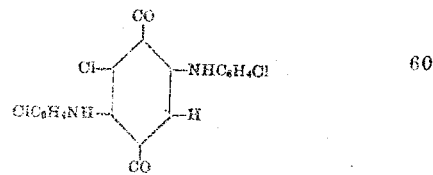

If other di-, tri- or tetra-halogen derivatives of benzoquinone are used, dyestuffs of the same character are obtained, two aminoradicals replacing hydrogen or halogen in the halogenated benzoquinone.

Having now particularly described my invention, what I claim is:

1. As new products, the herein described yellow vat dyestuffs, being derivatives of the benzoquinonedianilid

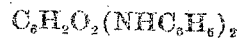

which contain halogen in the benzoquinone-nucleus and in the anilido groups, in the latter combined in para position to the nitrogen; said products being yellowish-brown to brownish-red powders, which are insoluble in alcohol, ether and benzene, soluble in hot glacial acetic acid and nitrobenzene with a brownish-red color, soluble in concentrated sulfuric acid with a violet coloration, and giving, when treated with alkaline hydrosulfite, light-yellowish solutions, from which the dyestuff can be regenerated by passing air into it; and dyeing wool when subsequently oxidized fast yellow tints.

2. As a new product, the herein described yellow vat dyestuff: chlorobenzoquinone-para-para-dichlorodianilid;

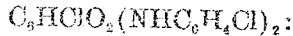

being a yellowish-brown powder, insoluble in alcohol, ether and benzene, soluble in hot glacial acetic acid and nitrobenzene with a brownish-red color, in concentrated sulfuric acid with a violet color, yielding, when gently heated with alkaline hydrosulfite, a light yellowish vat which dyes wool, when subsequently oxidized, fast yellow tints.

3. The process of manufacturing yellow vat dyestuffs which consists in causing para-halogen substituted anilins to act upon halogen derivatives of benzoquinone containing more than one halogen atom.

4. The process of manufacturing a yellow vat dyestuff, which consists in causing para-chloranilin to act upon 2.6-dichlorobenzoquinone.

In testimony whereof, I affix my signature in presence of two witnesses.

RUDOLF MAAG.

Witnesses:
JEAN GRUND,
CARL GRUND.